United States Patent Office 2,776,056
Patented Jan. 1, 1957

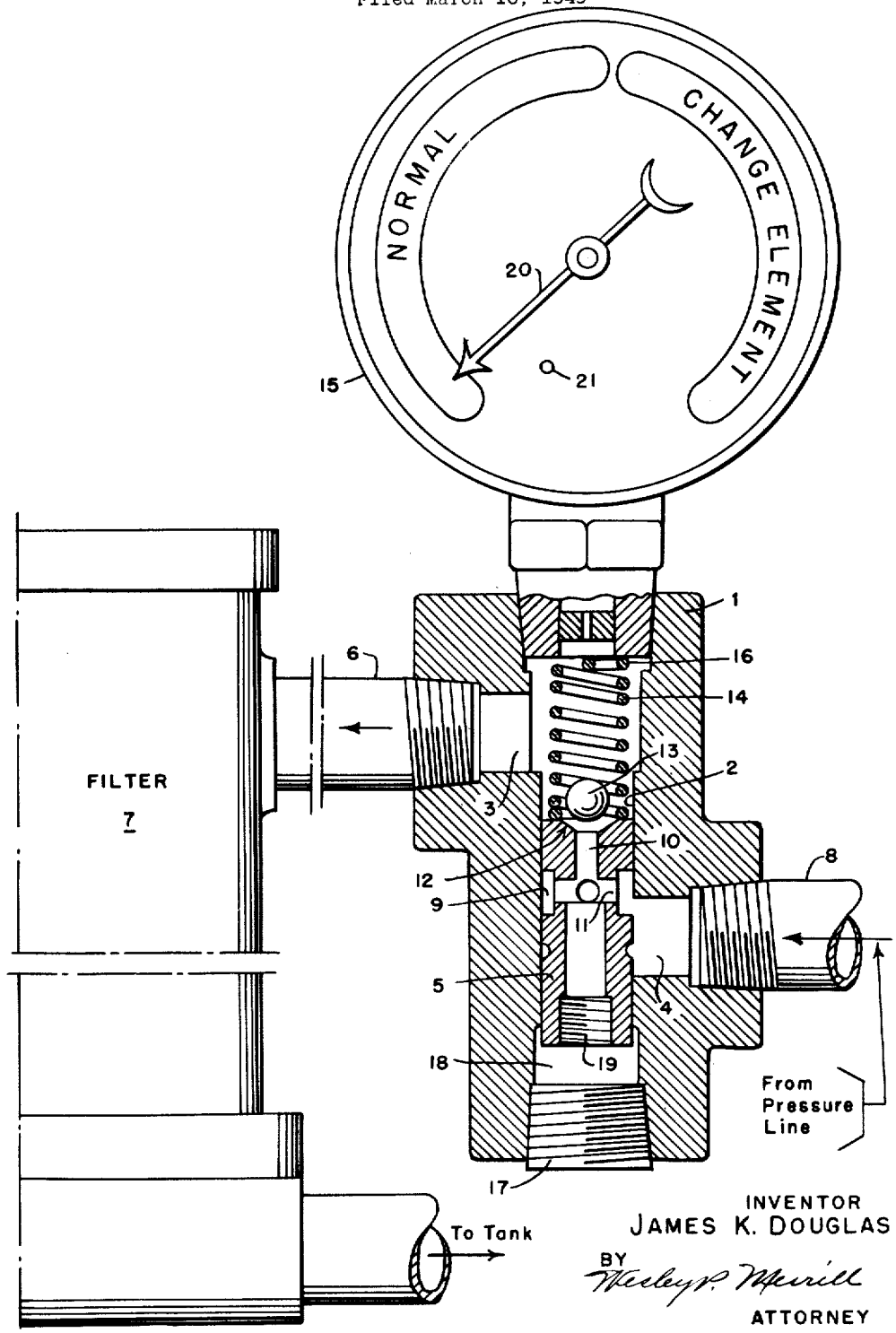

2,776,056

APPARATUS FOR FILTERING LIQUID

James K. Douglas, Shorewood, Wis., assignor to The Oilgear Company, Milwaukee, Wis., a corporation of Wisconsin Application March 16, 1949, Serial No. 81,688

5 Claims. (Cl. 210—166)

This invention relates to apparatus for filtering liquid in a hydraulic system and it is particularly adapted to control the rate of flow through a filter which is employed to remove foreign matter from the liquid.

The liquid employed in a hydraulic system ordinarily is free from foreign matter when it is introduced into the system but it soon becomes contaminated with foreign matter which must be removed in order that the system may operate efficiently. It is common practice to direct liquid from a part of the system containing liquid under pressure through a filter which removes the foreign matter from the liquid passing therethrough and discharges the filtered liquid into a low pressure part of the system such as the tank from which the system is supplied with liquid.

The flow of liquid through a filter must be kept at a low rate in order to prevent an excessive drop in the pressure in the part of the system from which the liquid is directed to the filter. This has heretofore been accomplished by inserting a choke, which ordinarily is an orifice, between the filter and the part of the system from which the filter is supplied with liquid. However, in order to maintain the flow through the filter at the desired rate and to maintain the desired pressure in the system, the opening through the choke must be so small that a relatively small piece of foreign matter will clog the choke and thereby stop the flow of liquid to the filter. Such a choke becomes clogged quite often and when it does the filtering system becomes ineffective, and it sometimes remains ineffective for long periods of time. Often operation of the system must be suspended while the choke is removed and cleaned.

The present invention has as an object to provide a flow control device which will pass pieces of foreign matter much larger than those which would pass through the chokes heretofore employed.

As foreign matter accumulates in the filter, the interstices in the filtering element thereof will gradually become clogged so that a higher pressure is required to cause liquid to flow through the filter at the desired rate.

Another object of the invention is to provide a flow control device which will increase the pressure at the inlet of the filter in response to an increase in the resistance to the flow of liquid through the filter.

The filtering element will eventually become so clogged with foreign matter that it cannot remove all of the foreign matter from the liquid and the flow through the filter is reduced below the desired rate at which time it is necessary to replace the filtering element with a new one.

Another object of the invention is to provide means for indicating when the filtering element should be changed and when the choke is clogged or partly clogged.

Other objects and advantages will appear from the following description of the embodiment of the invention shown in the accompanying drawing.

The flow control device shown in the drawing includes a valve body 1 having formed therein an axial bore 2, an outlet port 3 and an inlet port 4 both of which communicate with bore 2. Communication between ports 3 and 4 is controlled by a valve 5 which is closely fitted in bore 2 to slide therein.

Outlet port 3 communicates with bore 2 at the upper end thereof and is adapted to be connected as by means of a pipe 6 to the inlet of a filter 7. Inlet port 4 is spaced from port 3 and from the lower end of bore 2 and is adapted to be connected, as by means of a pipe 8, to a source of liquid under pressure such as a part of a hydraulic circuit.

Valve 5 is provided with a peripheral groove 9 to communicate with inlet port 4 and with an axial passage 10 which extends downward from the upper end of valve 5 and is connected to groove 9 as by means of one or more radial passages 11. Passage 10 is large enough to pass pieces of foreign matter of substantial size but it is restricted sufficiently to limit the rate of flow therethrough so that it and the upper part of valve 5 constitute a choke for limiting the rate of flow of liquid from groove 9 to outlet port 3.

If filter 7 were higher than the source to which inlet 4 is connected or if filter 7 were partly clogged so that there would be a high pressure in the upper part thereof and if the pressure at the source were reduced to zero such as by stopping the operation of the hydraulic system to which the device is connected, contaminated liquid would tend to flow from the filter to the source. In order to prevent such back flow of liquid, a valve seat 12 is formed in the upper end of valve 5 around the outlet of passage 10 and a ball valve 13 is arranged upon seat 12 so that liquid flowing from the inlet 4 to outlet 3 can raise ball 13 from its seat but, as soon as such flow stops, ball 13 will engage seat 12 and prevent flow in the opposite direction.

Valve 5 is urged downward by a helical compression spring 14 which engages the upper end thereof and encircles ball 13. Spring 14 has been shown as reacting against the stem of a gage 15 threaded into the upper end of bore 2. However, it often is desirable to arrange gage 15 at a remote point and connect it to valve body 1 by a pipe which is threaded into bore 2 and against which spring 14 reacts. In such a case, a sudden rush of pressure at inlet 4 might propel ball 13 into the pipe. Therefore, in order to retain ball 13 within body 1 so that it will fall onto seat 12 when the pressure drops, the uppermost turn 16 of spring 14 is bent diametrically inward to limit the upward movement of ball 13.

The lower end of bore 2 is closed by a plug 17 and constitutes a pressure chamber 18 which communicates with groove 9 so that the lower end of valve 5 is subjected to any pressure prevailing in groove 9. As shown, valve 5 is provided with an axial passage 19 which extends upward from the lower end thereof and is connected to groove 9 as by means of the passages 11.

The arrangement is such that, when there is no pressure in inlet port 4, spring 14 will hold valve 5 in its lowermost position so that groove 9 is fully open to port 4. When liquid under pressure is supplied to port 4, it will flow therefrom through groove 9, passages 11 and 10, bore 2, port 3 and pipe 6 into filter 7 which will offer some resistance to the flow therethrough and the pressure required to force the liquid through the filter will act upon the upper end of valve 5 and assist spring 14 in urging valve 5 downward.

At the same time, pressure will extend from groove 9 through passages 11 and 19 into chamber 18 and act upon the lower end of valve 5. Passage 10 will resist the flow of liquid therethrough and thereby cause the pressure in the upper end of bore 2 to be so much less than the pressure in groove 9 and in chamber 18 that the force exerted upon the sum of the forces exerted upon the upper end of valve 5 by spring 14 and by the liquid in the upper end of bore 2 and thereby cause valve 5 to be moved upward by the preponderance of force on the lower end thereof.

As valve 5 moves upward, groove 9 will move partly out of registry with port 4 and the flow of liquid from port 4 into groove 9 will be throttled through the opening between the lower edge of groove 9 and the upper edge of port 4, thereby reducing the pressure in groove 9 and in chamber 18 below the pressure in port 4. The lower part of valve 5 and the lower part of body 1 thus constitute a throttle valve for limiting the rate of flow in the passage 10. Valve 5 will continue to move upward and cause the pressure in groove 9 and in chamber 18 to be reduced until the force exerted upon the lower end of valve 5 by the liquid in chamber 18 is just equal to the sum of the forces exerted upon the upper end of valve 5 by spring 14 and the liquid in the upper part of bore 2. That is, the drop in pressure across passage 10 is just equal to the force exerted by spring 14.

Since the rate of flow through a passage of a given length is approximately proportional to the area of the passage and the drop in pressure thereacross, and since the pressure at the inlet of passage 10 is considerably less than the pressure at the source, passage 10 may be made large enough in diameter to pass particles of foreign matter large enough to clog a choke (such as those heretofore used) which is capable of causing the desired drop in pressure between the source and the filter.

If the pressure at the source should increase, the pressure in chamber 18 would increase proportionally and would raise valve 5 and thereby reduce the flow into groove 9 until the pressure therein was reduced to its initial value. If the pressure at the source should decrease, the pressure in chamber 18 would decrease proportionally and permit the forces acting upon the upper end of valve 5 to move valve 5 downward and thereby increase the flow into groove 9 until the pressure therein was increased to its initial value. The rate of flow through passage 10 is thus maintained constant.

As foreign matter accumulates in the filtering element of filter 7, a higher pressure is required to force liquid therethrough at a given rate. However, since the rate of flow through passage 10 is constant, the increased resistance to the flow of liquid through filter 7 causes the pressure in the upper end of bore 2 to rise and to move valve 5 downward and thereby increase the rate of flow into groove 9 until the drop in pressure across passage 10 is restored to its initial value. The rate of flow through filter 7 is thus maintained constant until a pressure higher than the pressure at the source is required to force liquid through filter 7 at the desired rate.

The pressure in port 3 extends into gage 15. When the pressure in port 3 is zero, the indicator 20 of gage 15 is against a stop 21. When the pressure in port 3 becomes high enough to cause liquid to flow through filter 7 at the desired rate, indicator 20 will move away from stop 21 and onto a scale shown as being marked "normal." As foreign matter accumulates in the filter element and causes the pressure in port 3 to rise, indicator 20 will move along the "normal" scale until the filter element becomes so clogged with foreign matter that it cannot properly filter the liquid at which time the pressure has risen high enough to cause indicator 20 to move beyond the "normal" scale and onto a scale which indicates that the filtering element should be changed and has been shown as being marked "change element."

If the opening between the upper edge of port 4 and the lower edge of groove 9 should become clogged with foreign matter, the pressure in port 3 would drop and cause indicator 20 to move toward or against stop 21 thereby indicating that the flow regulator should be cleaned. Cleaning the flow regulator is easily accomplished by merely removing plug 17 and pulling valve 5 out through the lower end of body 1 by means of a tool detachably connected to the lower threaded end of passage 19.

The rate of flow through the filter is thus maintained constant as long as neither the filtering element nor the flow control becomes clogged and the operator of the system is immediately advised when the filtering element needs to be changed and when the flow control device needs to be cleaned.

The flow control herein set forth may be modified in various ways and adapted to various uses without departing from the scope of the invention which is hereby claimed as follows:

I claim:

1. An apparatus for removing foreign matter from liquid drawn from a high pressure part of a hydraulic circuit at a rate which is only a small fraction of the rate at which liquid may flow in said circuit and for indicating whether or not said apparatus is functioning, said apparatus comprising a filter having an intake and a discharge and a replaceable filtering element arranged between said intake and said discharge, means for connecting said discharge to a low pressure part of said circuit, a valve body having an inlet and an outlet, means for connecting said inlet to a high pressure part of a hydraulic circuit, means for connecting said outlet to the intake of said filter, a choke arranged between said inlet and said filter to limit the flow of liquid to said filter to a rate determined by the pressure drop across said choke, a valve fitted in said body to throttle the flow of liquid from said inlet to said choke, a spring engaging one end of said valve and urging said valve in a direction to open communication between said inlet and said choke, said valve having the end thereof which is engaged by said spring subjected to the pressure at the outlet of said choke and the other end thereof subjected to the pressure at the inlet of said choke to enable said valve to maintain the pressure drop across said choke substantially constant regardless of variations in pressure at said inlet and at the intake of said filter, a check valve arranged between said filter and said choke to prevent flow of liquid from the intake of said filter to said circuit, and an instrument for indicating whether or not said apparatus is functioning connected between said choke and said filter and operable in response to variations in the pressure at the intake of said filter, said instrument having means to indicate whether or not said filtering element should be changed and whether or not said choke is obstructed with foreign matter.

2. An apparatus for removing foreign matter from liquid drawn from a high pressure part of a hydraulic circuit at a rate which is only a small fraction of the rate at which liquid may flow in said circuit, said apparatus comprising a filter having an intake and a discharge and a replaceable filtering element arranged between said intake and said discharge, means for connecting said discharge to a low pressure part of said circuit, a valve body having an inlet and an outlet spaced from each other and an axial bore communicating with said inlet and said outlet and extending beyond said inlet to provide a pressure chamber, means for connecting said inlet to a high pressure part of a hydraulic circuit, means for connecting said outlet to the intake of said filter, a plunger fitted in said bore and having a valve formed upon one portion thereof for controlling the flow of liquid from said inlet into said bore and a second portion provided with a radial passage to communicate with said inlet and an axial choke passage leading from said radial passage through one end of said plunger to permit liquid to flow from said inlet to said filter and to limit said flow to a rate determined by the drop in pressure across said choke passage, said plunger being urged in a direction to cause said valve to open communication between said inlet and said radial passage by the pressure at the outlet of said choke passage acting upon said one end of said plunger, a spring arranged in one part of said bore and engaging said one end of said plunger to urge said plunger in said direction, said plunger also having a passage extending from said radial passage through said valve portion into communication with said pressure chamber to enable the pressure at the inlet of said choke passage to act upon the end of said valve portion and urge said valve in a direction to close communication between said inlet and said radial passage so that the forces exerted upon opposite ends of said plunger by said liquid and said spring cause said valve to throttle the flow of liquid into said axial passage and to regulate the pressure therein until the drop in pressure across said choke passage is proportional to the force exerted by said spring, and a check valve arranged between said filter and said choke passage to prevent flow of liquid from the intake of said filter to said circuit.

3. An apparatus according to claim 2 and including a pressure responsive instrument connected between said choke passage and said filter and having means to indicate whether or not said filtering element should be changed and whether or not said choke is obstructed by foreign matter.

4. An apparatus according to claim 2 in which said valve body is arranged in a vertical position and which has a valve seat arranged upon the upper end of said plunger around the outlet of said choke passage, a ball valve adapted to engage said seat by gravity to prevent flow of liquid from the inlet of said filter to said circuit, and a pressure responsive instrument connected to the upper end of said bore and having means to indicate whether or not said filtering element should be changed and whether or not said choke passage is obstructed by foreign matter, and the upper coil of said spring is extended diametrically inward to prevent said ball valve from being propelled beyond said spring by a sudden rush of pressure at said inlet.

5. An apparatus according to claim 2 including a removable element for closing the end of said pressure chamber and in which said plunger has a connection in the end thereof opposite said spring to permit said plunger to be removed from said bore by removing said element and connecting a tool to said connection.

References Cited in the file of this patent
UNITED STATES PATENTS

| | | |
|---|---|---|
| 1,866,284 | Adelson | July 5, 1932 |
| 1,907,162 | Webb | May 2, 1933 |
| 1,955,693 | Turner | Apr. 17, 1934 |
| 1,955,903 | Cammen | Apr. 24, 1934 |
| 2,281,053 | Seney et al. | Apr. 28, 1942 |
| 2,313,149 | Jacobsson | Mar. 9, 1943 |
| 2,367,662 | Baxter | Jan. 23, 1945 |

OTHER REFERENCES

Webb Uniflow Regulator (pages 1 and 2).

UNITED STATES PATENT OFFICE

CERTIFICATE OF CORRECTION

Patent No. 2,776,056 January 1, 1957

James K. Douglas

It is hereby certified that error appears in the printed specification of the above numbered patent requiring correction and that the said Letters Patent should read as corrected below.

Column 2, line 71, after "the force ex-" insert -- erted upon the lower end of valve 5 by the liquid in cham- --.

Signed and sealed this 1st day of October 1957.

(SEAL)

Attest:

KARL H. AXLINE
Attesting Officer

ROBERT C. WATSON
Commissioner of Patents